(12) United States Patent
Shah et al.

(10) Patent No.: US 8,643,775 B2
(45) Date of Patent: Feb. 4, 2014

(54) SIMPLIFIED DATA INTERFACE PROTOCOL FOR DIGITAL TELEVISION RECEIVER

(75) Inventors: Anand Mahendra Shah, San Francisco, CA (US); Stephen Biracree, Rochester, NY (US); Raúl Alejandro Casas, Doylestown, PA (US); Slobodan Simovich, San Francisco, CA (US); Thomas Joseph Endres, Seattle, WA (US)

(73) Assignee: Iberium Communications Inc., San Francisco, CA (US)

( * ) Notice: Subject to any disclaimer, the term of this patent is extended or adjusted under 35 U.S.C. 154(b) by 89 days.

(21) Appl. No.: 13/087,307

(22) Filed: Apr. 14, 2011

(65) Prior Publication Data

US 2011/0255008 A1 Oct. 20, 2011

Related U.S. Application Data

(60) Provisional application No. 61/324,117, filed on Apr. 14, 2010.

(51) Int. Cl.
*H04N 5/44* (2011.01)
*H04N 5/455* (2006.01)

(52) U.S. Cl.
USPC ........ 348/423.1; 348/725; 348/726; 348/720; 348/426.1

(58) Field of Classification Search
USPC ........... 348/720, 725, 726, 553, 423.1, 426.1; 725/62; 370/312; 375/316, 324, 340
See application file for complete search history.

(56) References Cited

U.S. PATENT DOCUMENTS

| | | | |
|---|---|---|---|
| 7,813,310 B2 * | 10/2010 | Song et al. | ..................... 370/312 |
| 2010/0061465 A1 * | 3/2010 | Limberg | .................. 375/240.27 |
| 2011/0141347 A1 * | 6/2011 | Suh et al. | .................. 348/426.1 |

* cited by examiner

*Primary Examiner* — Jefferey Harold
*Assistant Examiner* — Jean W Desir
(74) *Attorney, Agent, or Firm* — Olympic Patent Works PLLC

(57) ABSTRACT

Certain embodiments of the present invention encapsulate a variety of data, for example, FIC data, together with ATSC-M/H Service data, into a single IP stream, to simplify the interface between demodulator and media processor. A single data interface protocol within the receiver can then be used, facilitating integration.

3 Claims, 15 Drawing Sheets

| Bit Offset | 0-7 | 8-15 | 16-23 | 24-31 |
|---|---|---|---|---|
| 0 | Version / IHL | DS | Total_Length | |
| 32 | Identification | | Flags | Fragment_Offset |
| 64 | TTL | Protocol | Header_Checksum | |
| 96 | Source_IP_Address | | | |
| 128 | Dest_IP_Address | | | |
| 160 | Options (v bits) | | | |
| 160+v | Source_Port | | Destination_Port | |
| 192+v | Length | | Checksum | |
| 224+v | Payload | | | |

405 — UDP/IP Interface

FIG. 11

| Packet_ID | Definition |
|---|---|
| 00 | Reserved |
| 01 | FIC Data |
| 02 | TPC Data |
| 03 | DEMOD MSG |
| 04 | TUNER MSG |
| 05 - FF | Reserved |

Packet_ID Definition

SIMPLIFIED DATA INTERFACE PROTOCOL FOR DIGITAL TELEVISION RECEIVER

CROSS-REFERENCE TO RELATED APPLICATION

This application claims the benefit of Provisional Application No. 61/324,117, filed Apr. 14, 2010.

TECHNICAL FIELD

The present invention is related to the coupling of a demodulator with a media processor or general controller within a digital television receiver and, in particular, to coupling of a demodulator with a media processor through a common data interface protocol within the receiver.

BACKGROUND

Broadcast television faces tough and varying competition with various media distribution systems, from the Internet to direct express mail. In 2009, the United States transitioned terrestrial broadcast television from analog to digital, with the Advanced Television Systems Committee ("ATSC") standard finally supplanting the National Television Systems Committee ("NTSC") standard after a decade-long delay with respect to the initial roll-out plan. Observing some of the shortcomings of ATSC A/53 signal reception, and recognizing even tougher competition from emerging media distribution systems, such as, for example, applications on new "smart phones," the ATSC solicited proposals in 2007 for a backwards-compatible modification to the ATSC A/53 signal that could robustly deliver multiple media services to mobile and handheld devices, while at the same time providing for uninterrupted main-service delivery. The result is the ATSC A/153 standard, ratified in 2009, now a Published Standard in 2011. The ATSC A/153 standard, "A/153: ATSC Mobile DTV Standard, Parts 1-8," is available at http://www.atsc.org/cms/index.php/standards/published-standards/163-a153-atsc-mobile-dtv-standard-parts-1-8 in eight parts, currently an interim, or pre-publication version, with latest revision Oct. 15, 2009.

The ATSC-M/H service shares the same radio frequency ("RF") broadcast as the main service ATSC signal. The main service ATSC signal is described in "ATSC A/53, Digital Television Standard. Parts 1-6," available at http://atsc.org/cms/index.php/standards/published-standards. The main service ATSC signal delivers about 19.4 Mbps, and the ATSC-M/H uses up to about 38% of this total bandwidth. The ATSC-M/H data is partitioned into ensembles, each of which contains one or more services. Each ensemble uses a distinct Reed-Solomon frame in the forward-error-correction coding, so that each ensemble can be coded to a different level of error protection, depending on the intended use. Thus the RS frame is the basic data delivery unit of ATSC-M/H data, which is IP-encapsulated, and an ATSC-M/H service consists of a package of IP streams. In contrast to this IP packaging, main service A/53 data is an MPEG-2 transport stream.

The fast information channel ("FIC") is a separate data channel from the IP-encapsulated ATSC-M/H service data delivered through RS frames, carrying essential information, for rapid ATSC-M/H Service information, such as binding information between ATSC-M/H services and the ATSC-M/H ensembles carrying them, as well as version information for the ATSC-M/H service signaling channel of each ATSC-M/H ensemble. The FIC data is not IP-encapsulated. Furthermore, the ATSC-A/153 standard supports transport means other than IP encapsulation, by means of system configuration signaling, to enable future development of the ATSC-M/H system.

SUMMARY

Certain embodiments of the present invention encapsulate a variety of data, for example, FIC data, together with ATSC-M/H Service data, into a single IP stream, to simplify the interface between demodulator and media processor. A single data interface protocol within the receiver can then be used, facilitating integration.

BRIEF DESCRIPTION OF THE DRAWINGS

FIG. 11 shows a UDP/IP interface.
FIG. 12 shows a packet ID definition in accordance with one embodiment of the present invention.

DETAILED DESCRIPTION

The present invention encapsulates a variety of data into a single data interface protocol within a digital television receiver, facilitating integration. For example, for A/153, FIC data, together with ATSC-M/H Service data, can be integrated into a single transport protocol stream, such as an IP stream, simplifying the interface between demodulator and media processor or controller. When integrating the data interface protocol among tuner, demodulator, and media processor functions, a System-on-Chip ("SoC"), possibly implementing all functions on a single die, or more likely on multiple dies packaged together, integration and test time is reduced, and reliability increased, compared to an SoC using multiple data interface protocols to jointly communicate across SoC functions.

Figure 1:
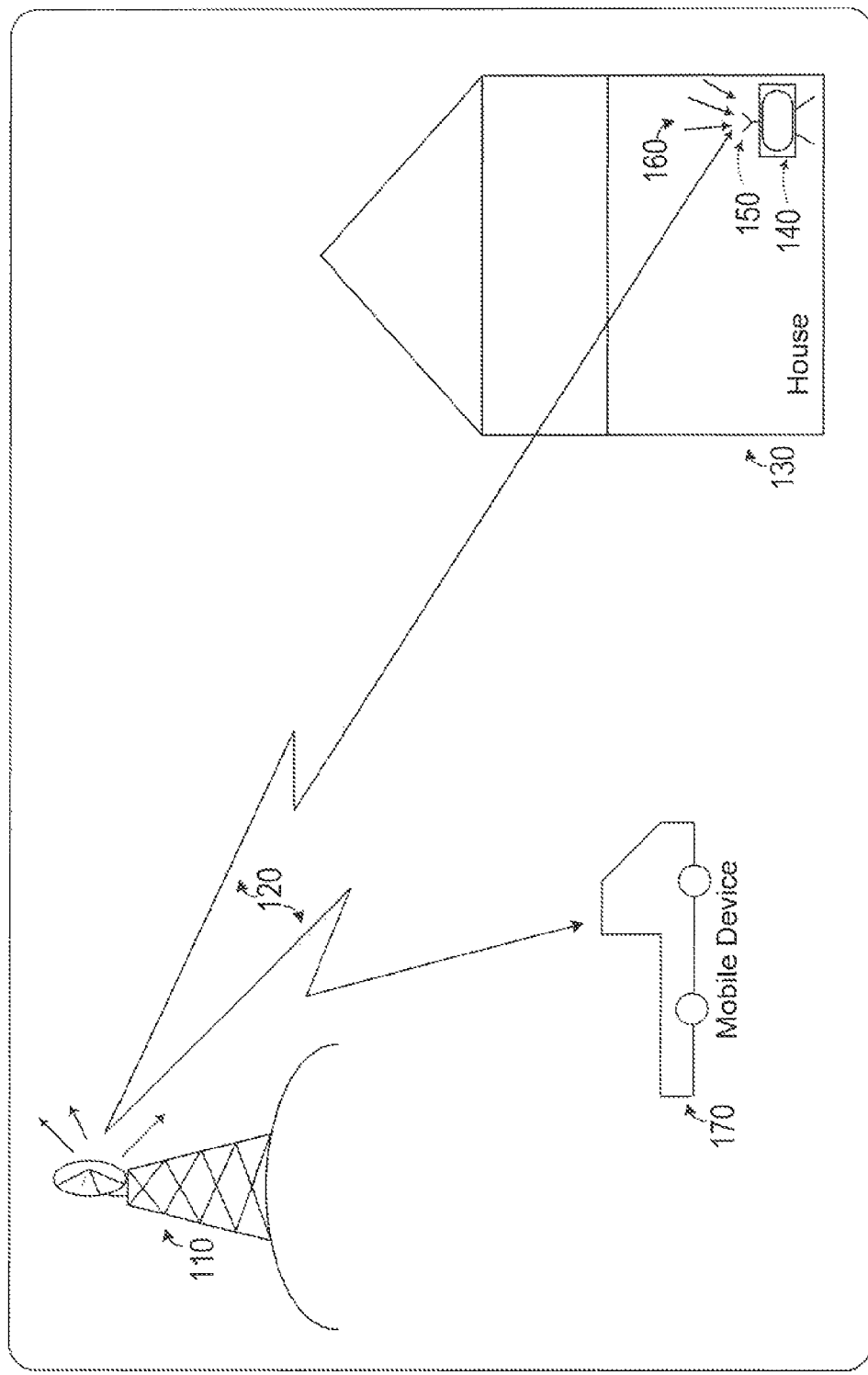
FIG. 1 shows a typical prior art digital television broadcast communication system.

FIG. 1 depicts a typical digital television broadcast communication system, used as an example of a communication system to which an embodiment of the present invention is applicable. Transmitter station 110 broadcasts Digital Television ("DTV") signal 120, which radiates through house 130 to antenna 150 and to, mobile device 170. The induced penetration loss of the RF carrier's signal power through house 130 can be significant, easily 20 dB. Antenna 150 is usually in close proximity to television 140, or can be remotely connected to television 140. Antenna 150 also receives multipath signals, collectively 160, which can be caused by reflections from other buildings, or items interior to house 130, such as walls, furniture, persons, etc. Broadcast signal 120 also radiates to mobile device 170. Mobile device 170 may be a vehicle with a television receiver in it, or a person with a mobile media player or smart phone, or any receiver which is in motion relative to transmitter station 110. Because of this relative motion, broadcast signal 120 which reaches mobile device 170 undergoes a Doppler shift, which must be tracked by the receiver in mobile device 170. This Doppler shift can be significant, and dynamic.

Figure 2A:
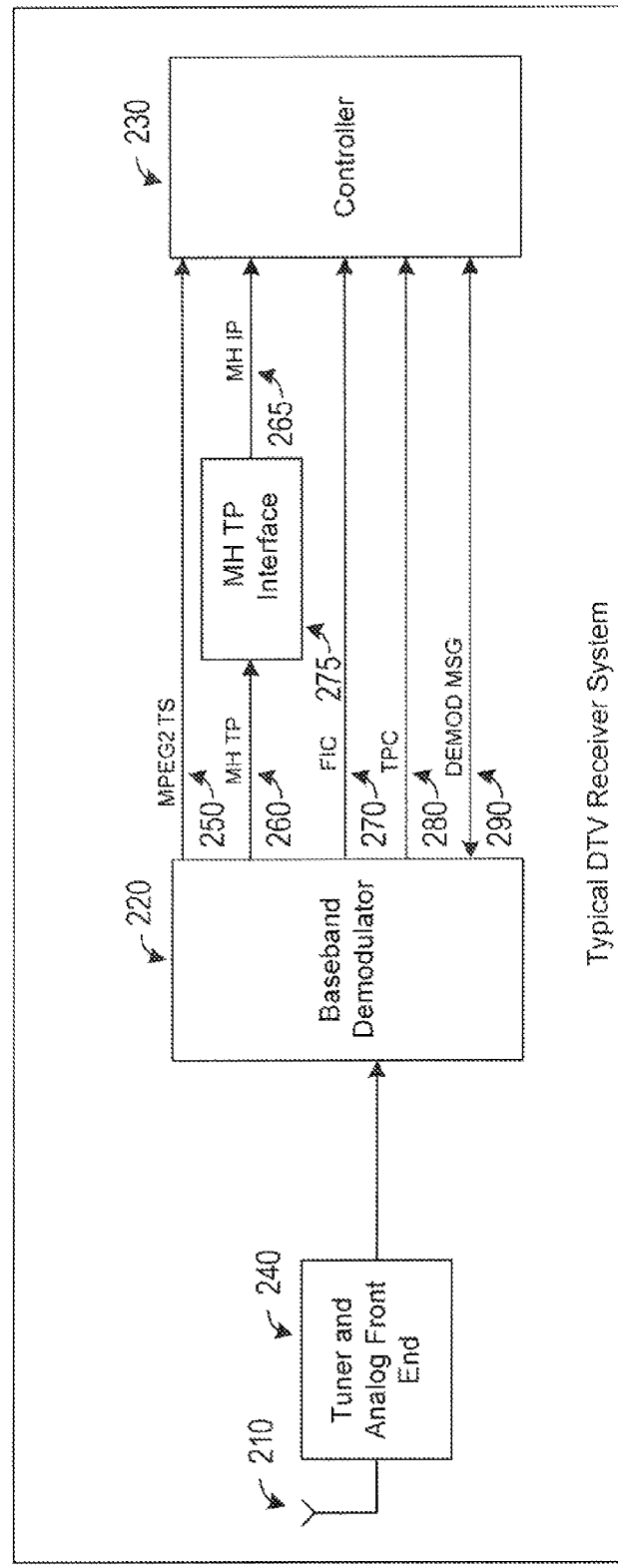
FIG. 2A shows a typical prior art DTV receiver system.

FIG. 2A shows a typical digital receiver system 200. Antenna 210 receives DTV broadcast signal 120, and is coupled to a tuner-and-analog-front-end module 240. Tuner-and-analog-front-end module 240 tunes to the proper broadcast channel, performs level setting and filtering, digitizes the analog signal, and supplies the bit stream to the baseband demodulator 220. Baseband demodulator 220 performs a multiplicity of tasks, including direct digital downconversion ("DDC"), filtering, symbol timing and carrier frequency synchronization, equalization, and forward error correction. Baseband demodulator module 220 recovers the data bits encoded into DTV signal 120 for presentation to controller module 230 which, among other functions, interprets the data bits and renders the multimedia content for display 140. Controller 230 can be a multimedia chip or core, just a CPU directing traffic to one or more multimedia chips or cores, an MPEG processor, or any processor tailored to a specific application. When the broadcast DTV system is in accordance with ATSC A/153, the aggregate data bits presented to the controller 230 are comprised of several categories of data including MPEG-2 Transport Stream ("TS") data 250, M/H Transport Packet ("TP") data 260, Fast Information Channel ("FIC") data 270, and Transmission Parameter Channel ("TPC") data 280. Additionally, the controller module 230 and Baseband Demodulator 220 exchange DEMOD_MSG data 290. Certain embodiments of the present invention pertain to the delivery to controller 230 of the recovered data bits encoded into DTV Signal 120 and to the exchange of DEMOD_MSG data 290.

Figure 2B:
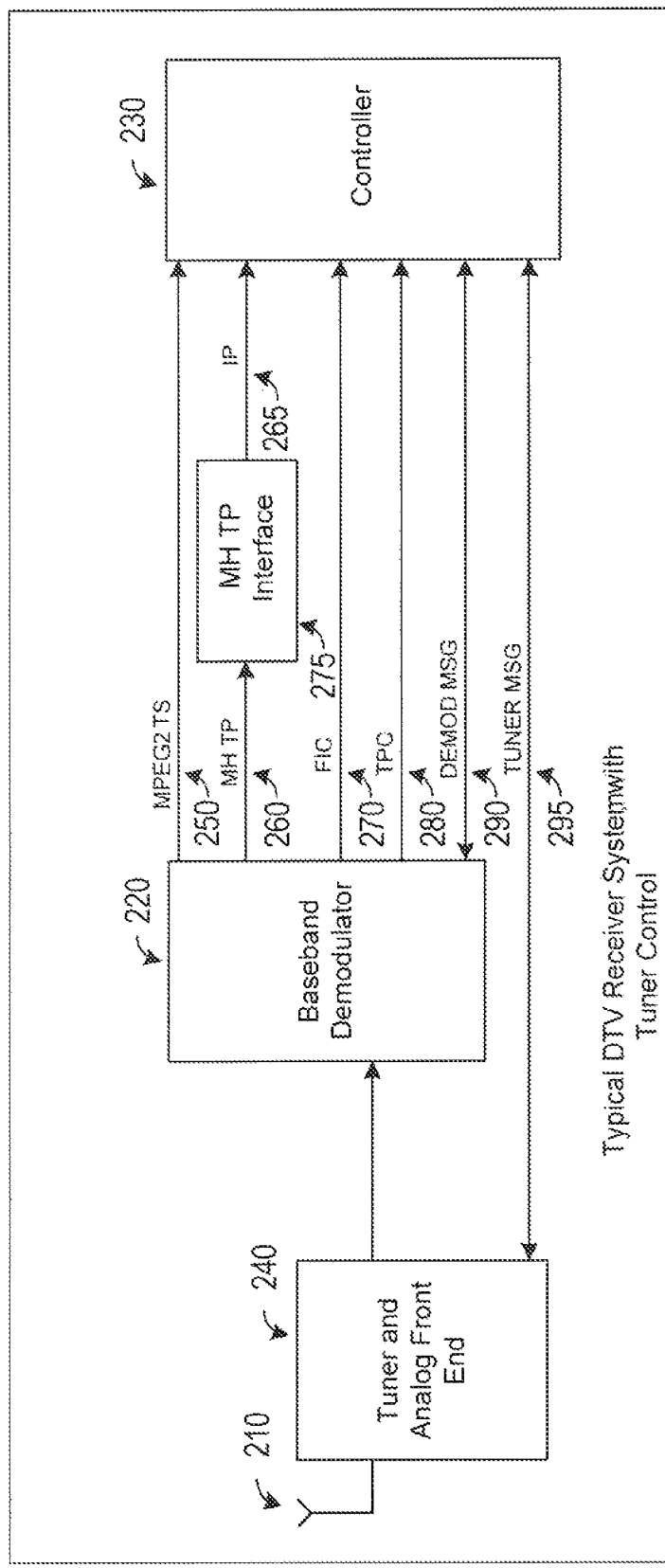
FIG. 2B shows a typical prior art DTV receiver system with tuner control.

FIG. 2B shows a typical DTV receiver system with tuner control. In FIG. 2B, controller 230 sends tuner messages, 295 directly to the tuner-and-analog-front-end module 240 using a mutually compatible data protocol, for the purpose of configuration and initialization, such as I2C. The data protocol is one that is supported by the tuner contained in the tuner-and-analog-front-end module 240. This results in additional requirements on controller 230 to support the data protocol. Certain embodiments of the present invention also pertain to the delivery of tuner messages 295 to the tuner-and-analog-front-end module 240.

Figure 3A:
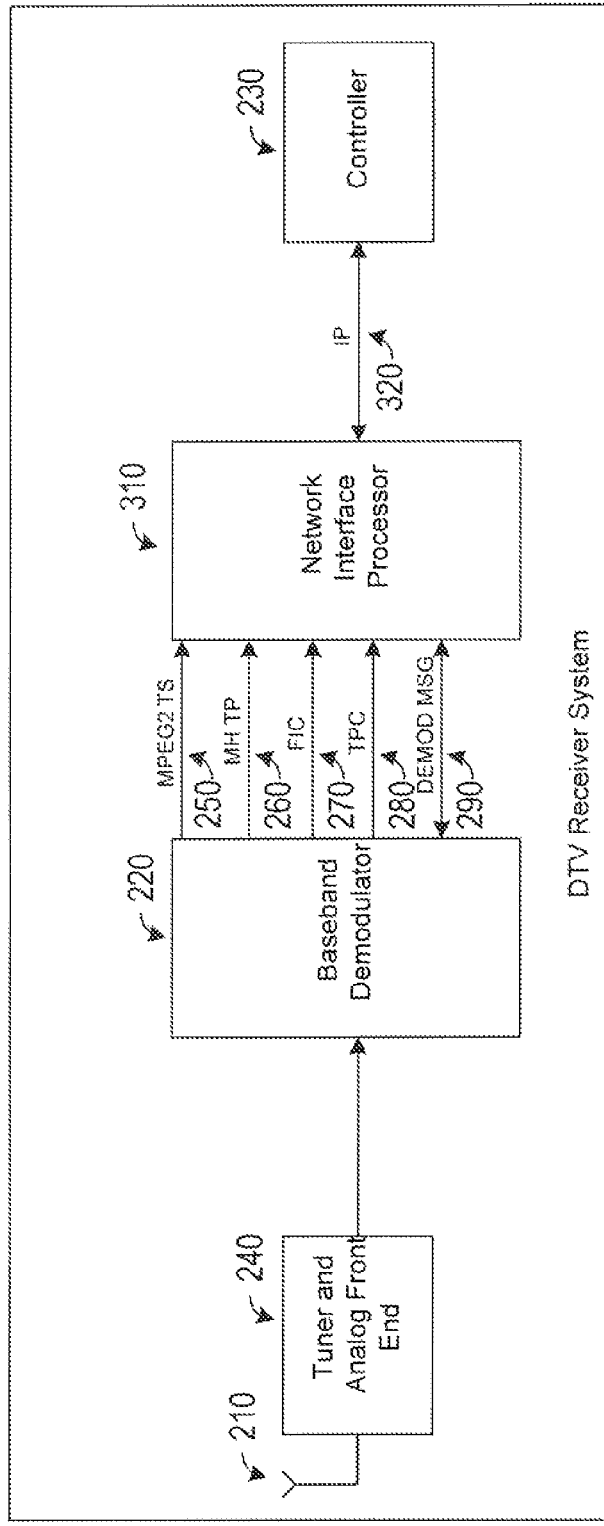
FIG. 3A shows a DTV receiver system in accordance with one embodiment of the present invention.

FIG. 3A shows a DTV receiver system in accordance with one embodiment of the present invention. To simplify the data interface between the baseband demodulator 220 and the controller 230, the embodiment of the present invention introduces a network interface processor ("NIP") 310. The NIP 310 encapsulates all categories of data passing between the baseband demodulator 220 and the controller 230 into IP datagrams and multiplexes the datagrams onto an IP data stream 320. Use of the NIP 310 reduces complexity of the controller 230. The number of hardware pins and software ports can be reduced by using the NIP 310. In the exemplary implementation depicted in FIG. 3A, MPEG-2 TS data 250, MH Transport Packet data 260, Fast Information Channel ("FIC") data 270, Transmission Parameter Channel ("TPC") data 280, and Demod Message data 290 are all encapsulated into IP datagrams and multiplexed onto a single data connection to the controller 230. Since IP packet multiplexing is a standardized technique in modern networking systems, controller 230 may use standardized IP software components to demultiplex the data into its original categories.

Figure 3B:
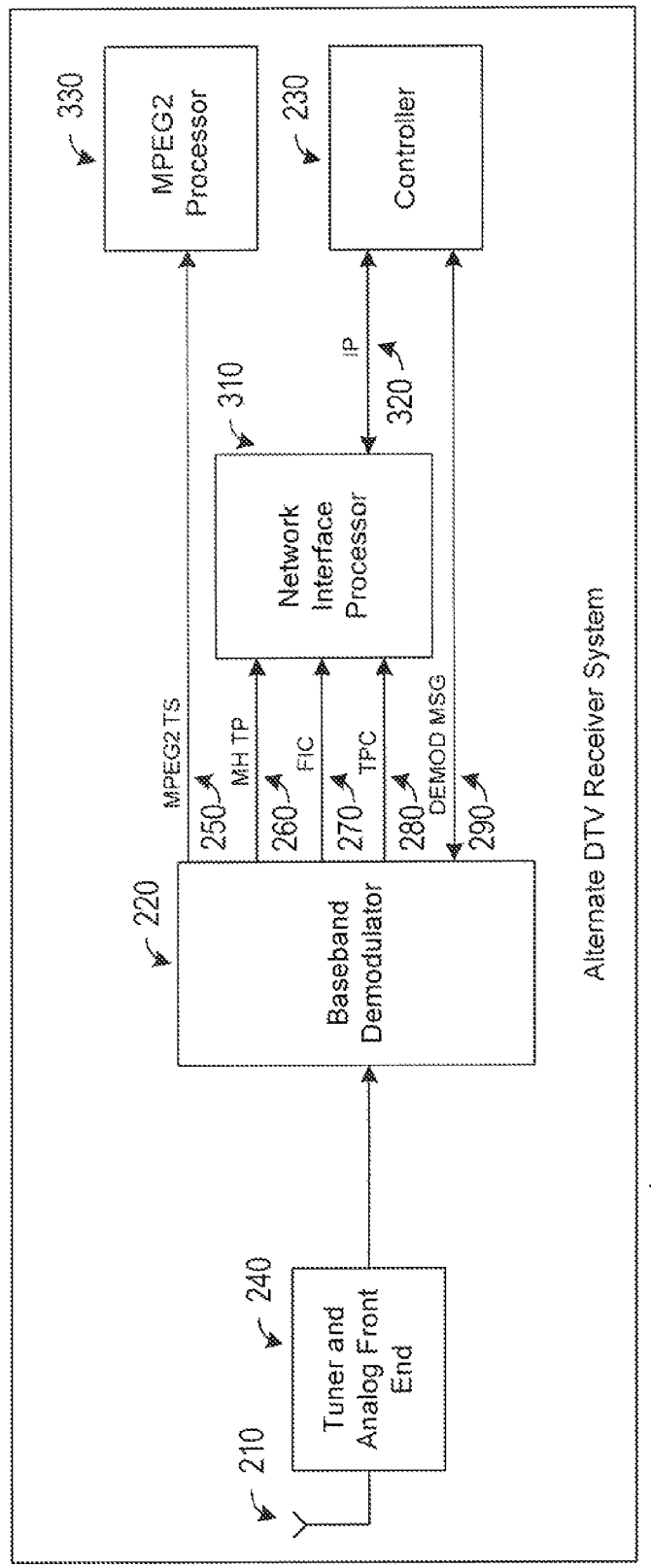
FIG. 3B shows an alternate DTV receiver system in accordance with one embodiment of the present invention.

FIG. 3B shows an alternate DTV receiver system in accordance with one embodiment of the present invention. In some system architectures, the MPEG-2 Transport Stream ("TS") data 250 may be sent directly to MPEG-2 processor 330 for decompression and formatting of the MPEG-2 video stream. For example, if a SoC is being built using an existing MPEG decoder, which does not contain an IP interface, and cannot be retrofitted cost effectively, the NIP 310 does not process the MPEG-2 Transport Stream ("TS") data 250, but is used instead for efficient communications with the baseband demodulator, the controller, or the tuner, as suited.

In FIG. 3B, data bits recovered from the DTV signal 120 that belong to an MPEG-2 Transport Stream ("TS") are not passed to the NIP 310, but are instead sent to MPEG-2 processor 330 without being encapsulated into IP datagrams. Other data from the baseband demodulator 220 are IP encapsulated by the NIP 310 and sent to the controller 230. The controller 230 and MPEG-2 processor 330 are shown as different functions, but controller 230 may include MPEG-2 processor 330 when implemented.

Figure 3C:
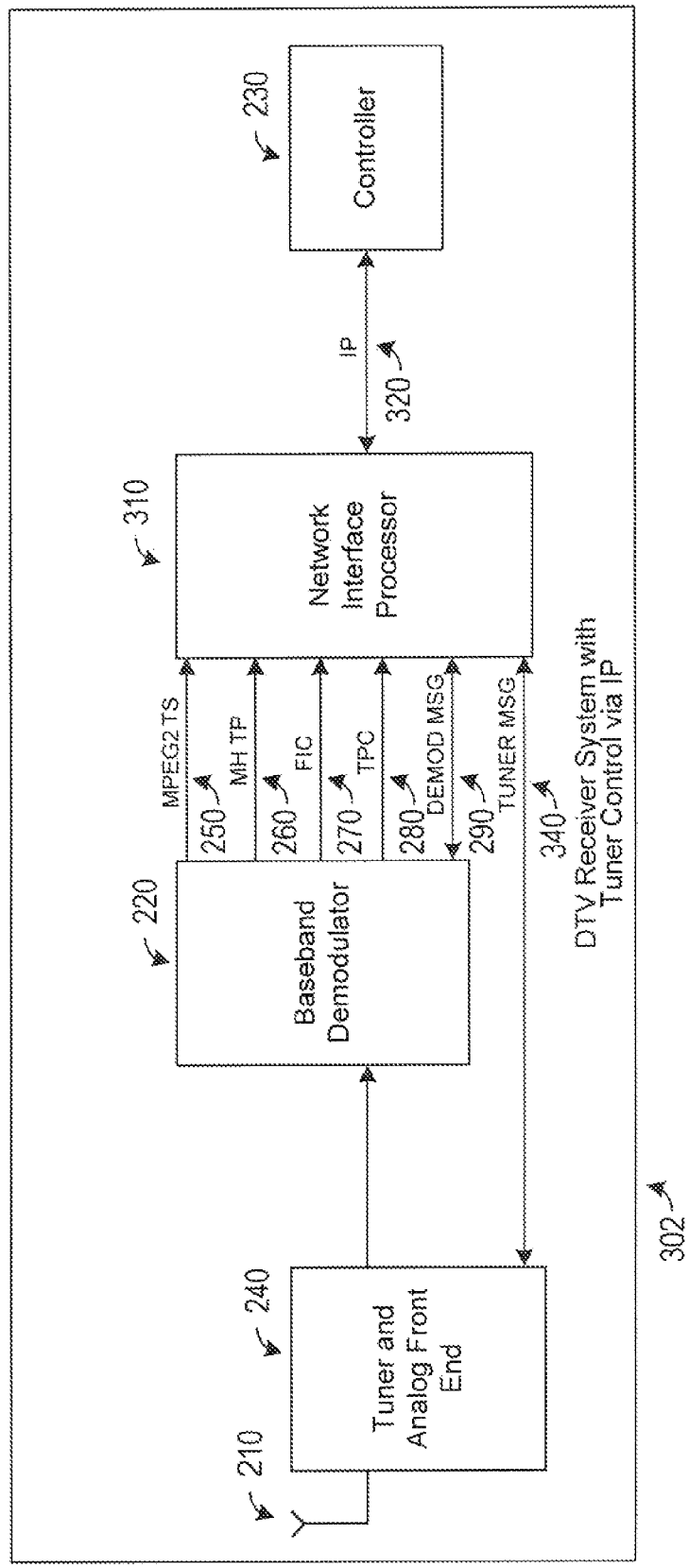
FIG. 3C shows a DIV receiver system with tuner control in accordance with one embodiment of the present invention.

FIG. 3C shows a DTV receiver system with tuner control in accordance with one embodiment of the present invention. When tuner message data 340 from controller 230 is required, the tuner message data 340 is first encapsulated in one or more IP datagrams and multiplexed onto IP data stream 320. The NIP 310 demultiplexes the IP datagrams and sends tuner message data 340 to the tuner-and-analog-front-end module 240 using a data protocol supported by the tuner-and-analog-front-end module 240. This relieves the controller 230 from the requirement of supporting the data format compatible with tuner message data 340. By encapsulating tuner message data 340 into IP datagrams, a single data interface protocol can be used, easing the integration of functions onto a System on Chip ("SoC"), where a silicon tuner is packaged with other receiver functions, for example, using a stacked-die or multi-chip-module ("MCM") approach.

Figure 4:
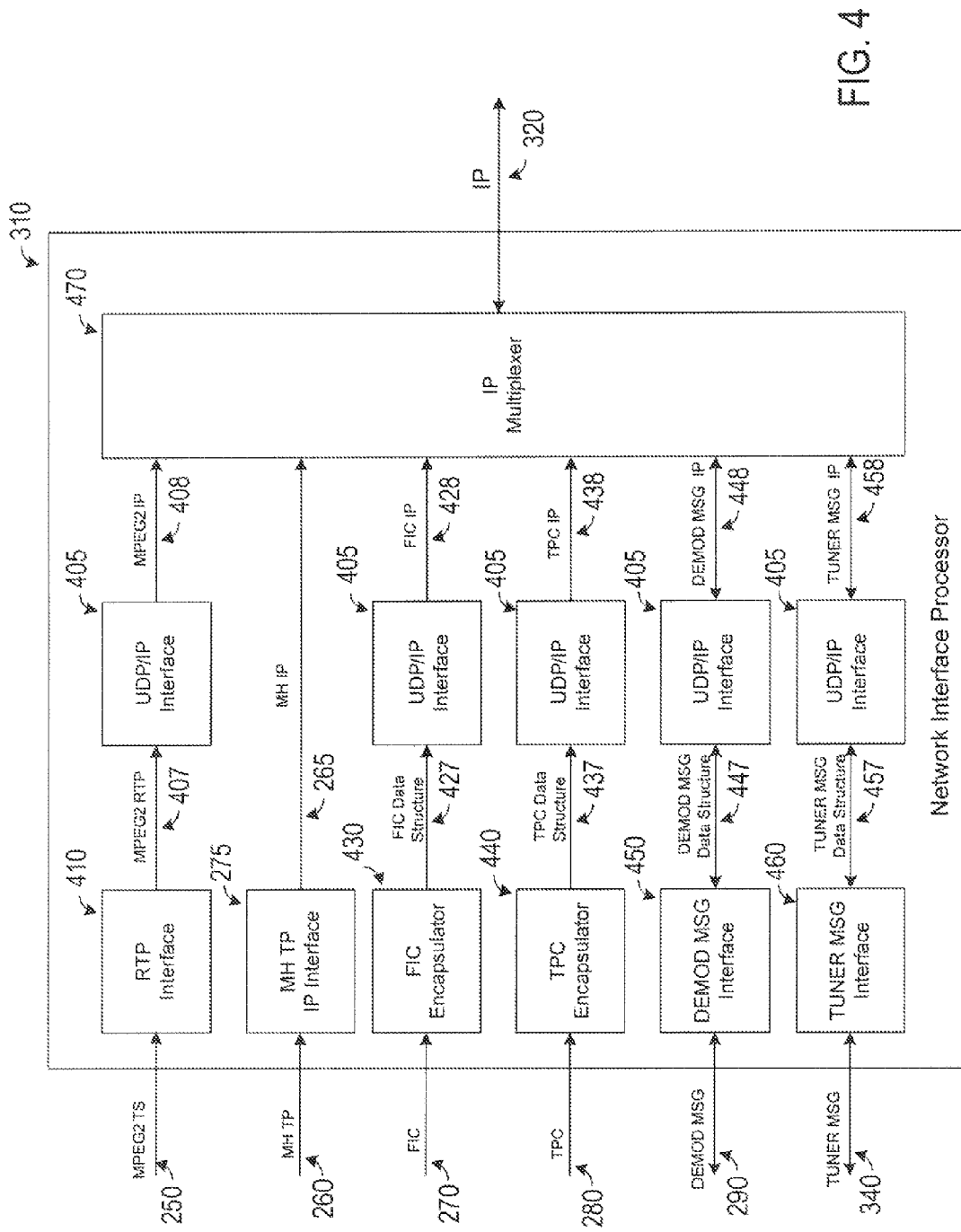
FIG. 4 shows a network interface processor in accordance with one embodiment of the present invention.

FIG. 4 shows a network interface processor 310 in accordance with one embodiment of the present invention. As previously described, the NIP 310 encapsulates the various categories of data passing between the baseband demodulator 220 and the controller 230 into IP datagrams and multiplexes the datagrams onto the IP data stream 320. FIG. 4 depicts a NIP 310 in accordance with one embodiment of the present invention for a system architecture as shown in FIG. 3A. That is, the MPEG-2 TS 250 data does not bypass the NIP 310. The NIP 310 can be modified to suit a particular application, for example, to encapsulate MPEG-2 TS 250, when desired.

RTP Interface 410 encapsulates the MPEG-2 TS 250 data using the Real Time Protocol ("RIP"). This may be accomplished, for example, in accordance with RFC 2250, "RTP Payload Format for MPEG 1/MPEG2 Video," January 1998.

The MH TP data 260, as produced by the baseband demodulator 220 is a series of data structures which includes IP encapsulated payload data. Therefore, no additional IP encapsulation is used for this portion of the data stream. The MH TP IP interface 275 manipulates the MH TP data 260 to extract the MH IP datagrams 265 from the series of structures that comprise MH TP data 260 and forward them directly to IP multiplexer 470. The FIC encapsulator 430 encapsulates FIC data 270, as recovered from the DIV signal 120 by the baseband demodulator 220, into FIC data structure 427. The TPC encapsulator 440 encapsulates TPC data 280, as recovered from the DTV signal 120 by the baseband demodulator 220, into the TPC data structure 437.

The DEMOD_MSG interface 450 is a bi-directional device which encapsulates DEMOD_MSG data 290 being sent to the controller 230 (or de-encapsulates DEMOD_MSG data being sent from the controller 230) into data structures that conform to a messaging protocol as needed for communicating with the baseband demodulator 220. An example of one embodiment of such a structure is the DEMOD_MSG data structure 447, shown in FIG. 9.

The TUNER_MSG interface 460 is a bidirectional device which encapsulates TUNER_MSG data 340 being sent to the controller 230 into TUNER MSG data structures 457 or de-encapsulates TUNER MSG data structures 457 being sent by the controller 230 into TUNER MSG data 340. UDP/IP Interface 405 forms IP datagrams using the User Datagram Protocol ("UDP") with a payload consisting of the data structure presented at its input. For example, when an FIC data structure 427 is presented to UPD/IP Interface 405, one or more FIC IP datagrams 428 is produced. IP Multiplexer 470 places all incoming IP datagrams onto IP data stream 320. IP multiplexer 470 is a bi-directional device and also demultiplexes incoming IP datagrams from IP data stream 320, and sends them to the appropriate circuit of NIP 310.

Figure 5:
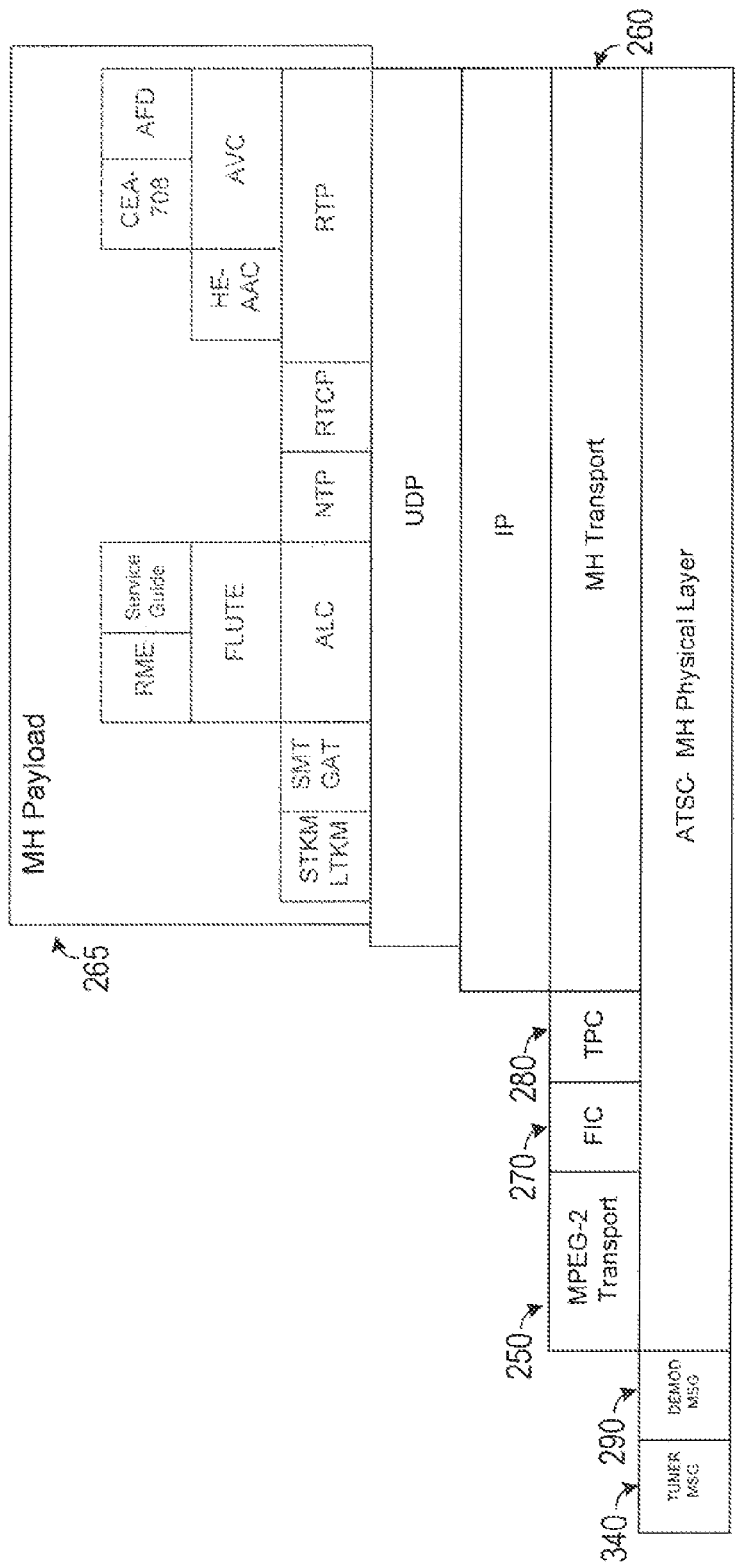
FIG. 5 shows the ATSC-M/H system protocol stack.

FIG. 5 shows the ATSC-M/H system protocol stack. The protocol stack depicts the categories of data bits delivered by DTV signal 120. The broad categories are MH Payload Data 265 which is UDP/IP encapsulated natively in the broadcast data, TPC Data 280, FIC Data 270, and MPEG-2 Transport Stream data 250. Also shown in FIG. 5 is data that is generated and consumed entirely within the receiver device and thus is present but is not derived from DTV signal 120. This data is DEMOD MSG Data 290 and TUNER MSG Data 340. Note that since the prior art system shown in FIG. 5 contains data of differing formats and protocols, many unique data interfaces within a receiver system may be necessary.

Figure 6:
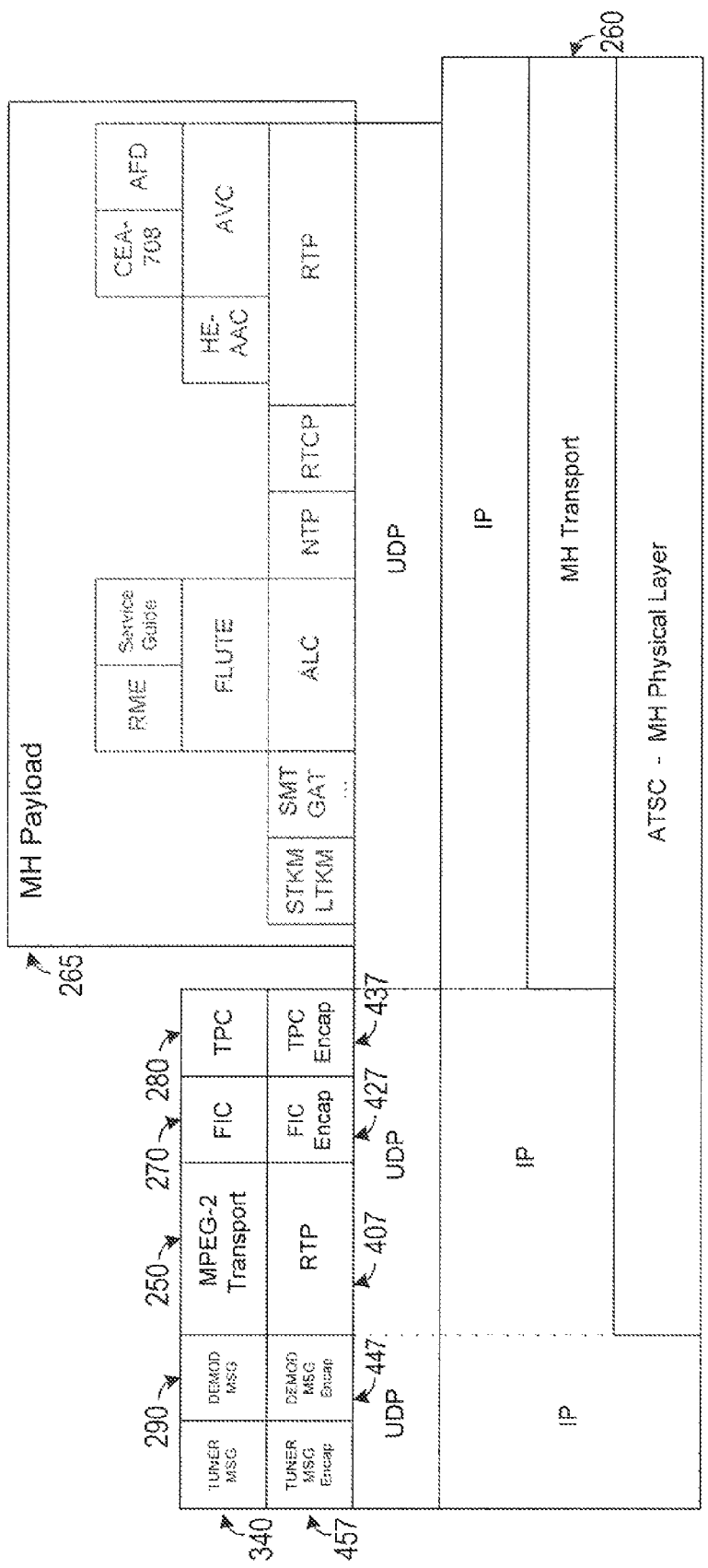
FIG. 6 shows an ATSC-M/H system protocol stack in accordance with one embodiment of the present invention.

FIG. 6 shows an ATSC-M/H system protocol stack in accordance with one embodiment of the present invention. FIG. 6 shows the result of the data formatting operations of NIP 310 in the format of a protocol hierarchy diagram. In this system, the data is UDP/IP encapsulated, making a single data interface protocol within a receiver device possible. The steps that accomplish the uniform protocol for all data are taken by the components within the NIP 310 as shown in FIG. 4. The data produced by the baseband demodulator 220 can be presented to other components of the receiver system, for example the controller 230, with a single, industry standard format.

Use of the User Datagram Protocol ("UDP") as the transport layer protocol over the IP layer in FIG. 6 is shown as an example implementation. UDP is an industry standard protocol, defined by RFC 768, used for data transmission without handshaking, making it useful for broadcast transmission. Some systems may desire the reliability that handshaking protocols provide, particularly for such system-critical data as tuner messages. In these cases, the Transmission Control Protocol ("TCP"), defined by RFC 793, or other transport layer protocols may be used in place of UDP.

FIGS. 7 through 12 show a method of encapsulating different types of packets into a single IP stream. The details of each data structure, including specific data fields, bit lengths, and bit-alignment comprise an example implementation of the present invention. These details may be expanded or changed. The term "data structure" is not limited to the output of an encapsulation step, but can also include the input data to the encapsulators in accordance with one embodiment of the present invention in FIGS. 7 through 12.

Figure 7:
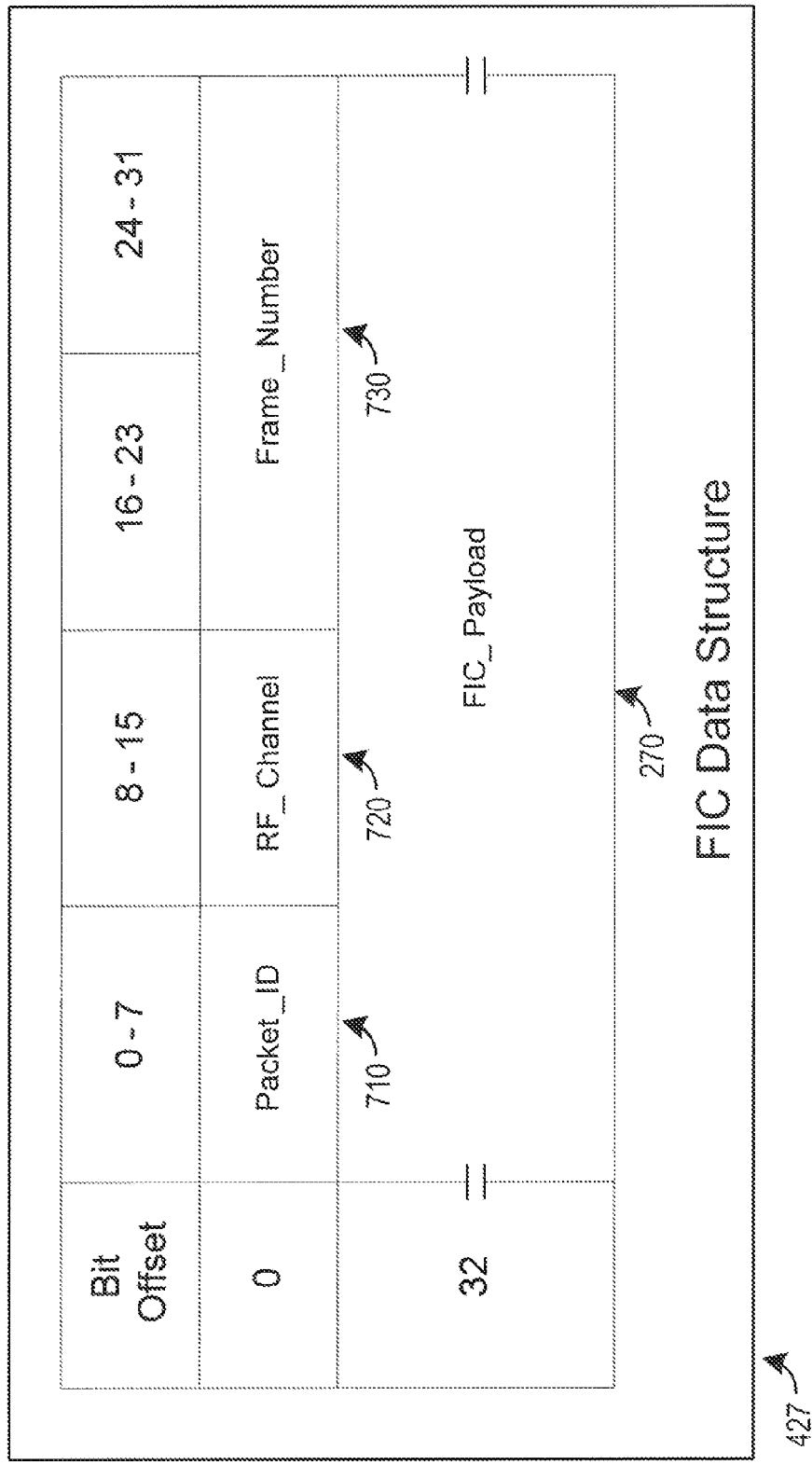
FIG. 7 shows a FIC data structure in accordance with one embodiment of the present invention.

FIG. 7 shows a FIC data structure 427 in accordance with one embodiment of the present invention. The FIC data structure 427 is associated with a method for encapsulating the FIC data into a data structure so that a single data interface protocol can be used within the receiver. The bit-fields of the FIC data structure 427 are defined next, and illustrated in FIG. 7.

The field Packet_ID 710 is 8 bits. It is defined in FIG. 12, and indicates that the packet contains FIC data. The field RF_Channel 720 is 8 hits. It indicates the TV Channel that is the source of the FIC data. The field Frame_Number 730 is 16 bits. It uses a 16-bit counter assigned by the DTV Receiver to the M/H Frame that is the source of the FIC data. The counter increments by 1 for each proceeding M/H Frame until it reaches 65535; upon which it rolls over to 0 for the next frame. The DTV receiver may initialize the counter to any value from 0 to 65535. The field FIC_Payload 270 is 32 bits. It contains the unabridged FIC data retrieved by the DTV Receiver from the MH Frame marked by Frame_Number 730 and from the TV channel indicated by RF_Channel 720. The FIC_Payload 270 may be of varying size and may be padded with zero bytes to ensure 32-bit alignment.

Figure 8:
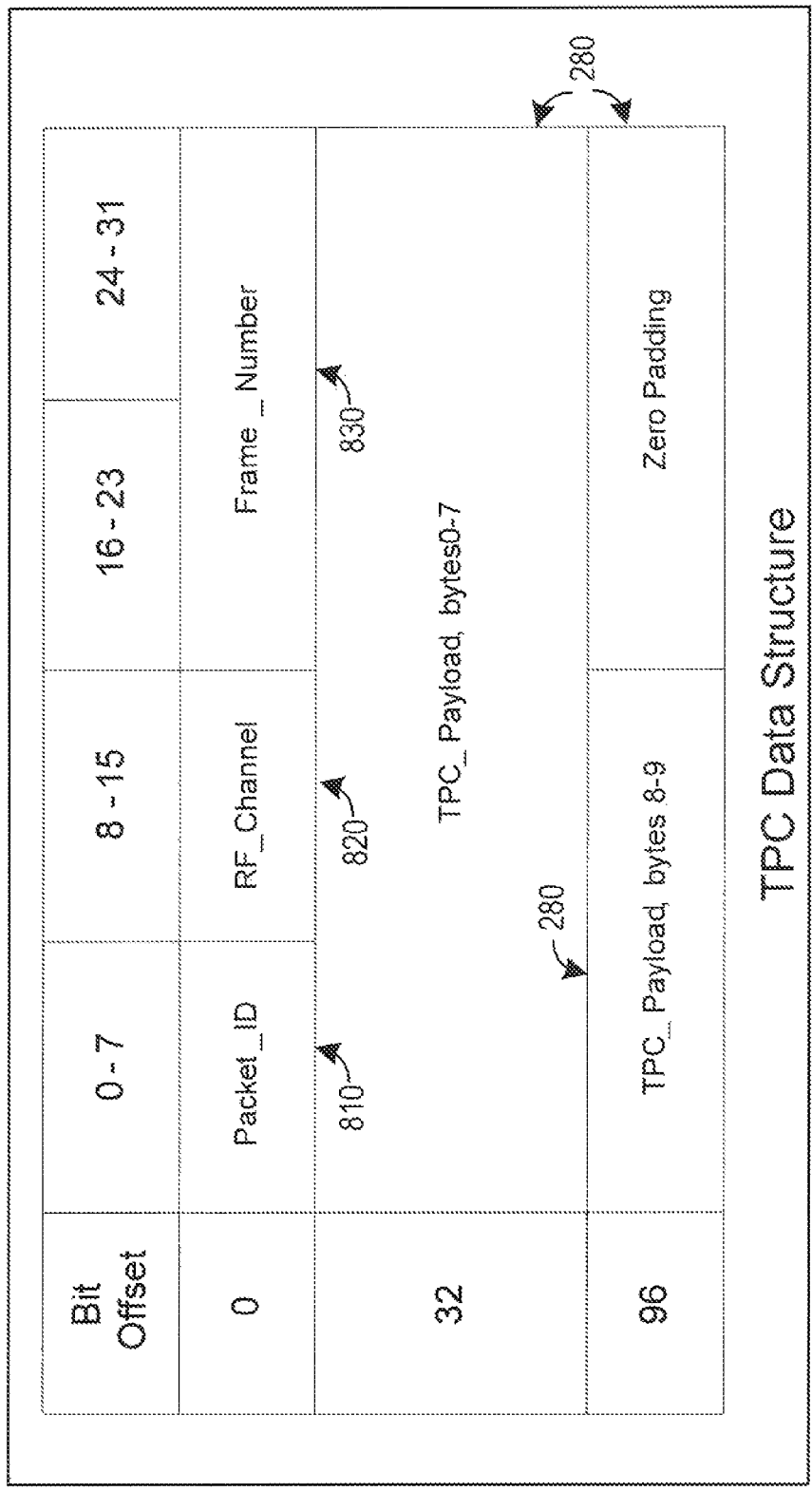
FIG. 8 shows a TPC data structure in accordance with one embodiment of the present invention.

FIG. 8 shows a TPC data structure 437 in accordance with one embodiment of the present invention. The FIC data structure 427 is associated with a method in accordance with one embodiment of the present invention for encapsulating the FIC data into a data structure, so that a single data interface protocol can be used within the receiver. The bit-fields of the TPC data structure 437 are defined next, and illustrated in FIG. 8.

The field Packet_ID 810 is 0.8 bits. It is defined in FIG. 12, and indicates that the packet contains TPC data. The field RF_Channel 820 is 8 bits. It indicates the TV channel that is the source of the TPC data. The field Frame_Number 830 is 16 bits. It uses a 16-bit counter assigned by the DTV Receiver to the M/H Frame that is the source of the TPC data. The counter increments by 1 for each proceeding M/H Frame until it reaches 65535; upon which it rolls over to 0 for the next frame. The DIV receiver may initialize the counter to any value from 0 to 65535. The field TPC_Payload 280 is 32 bits. It contains the unabridged TPC data retrieved by the DTV Receiver from the M/H Frame marked by Frame_Number 830 and from the TV channel indicated by RF_Channel 820. The TPC_Payload 280 consists of 10 bytes and may be padded with 2 zero bytes to ensure 32-bit alignment.

Figure 9:
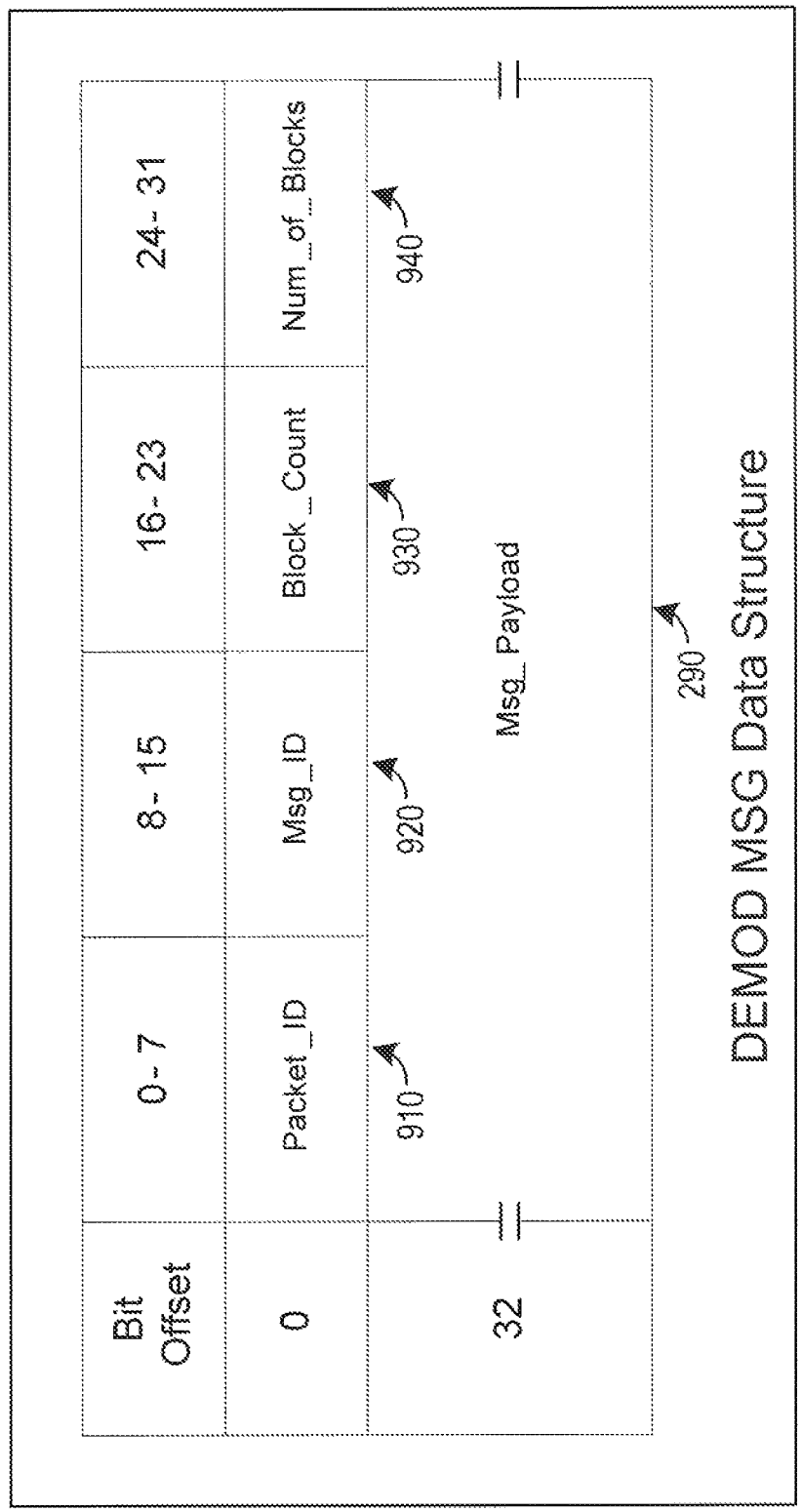
FIG. 9 shows a DEMOD MSG data structure in accordance with one embodiment of the present invention.

FIG. 9 shows a demodulator message data structure 447 in accordance with one embodiment of the present invention. The demodulator message data structure 447 is associated with a method in accordance with one embodiment of the present invention for encapsulating the demodulator message data into a data structure, so that a single data interface protocol can be used within the receiver. The bit-fields of the demodulator message data structure 447 are defined next, and illustrated in FIG. 9.

The field Packet_ID 910 is 8 bits. It is defined in FIG. 12, and indicates that the packet contains a message or message fragment directed to or from the Demodulator. The field Msg_ID 920 is 8 bits. It indicates the type of message or message fragment contained in the packet. The values of Msg_ID may be defined to any type of message that a Demodulator implementation requires, including as examples: START_DEMOD and STOP_DEMOD. The field Block_Count 930 is 8 bits. It holds the number of the message fragment contained in the packet, or zero if the entire message is contained in the packet. The $i^{th}$ fragment of a message is assigned a Block_Count of i. A message may be divided into fragments to satisfy a packet length limitation described here or elsewhere. The field Num_of_Blocks 940 is 8 bits. It holds the total number of fragments into which the message has been divided, or one if the entire message is contained in the packet. A message may be divided into fragments to satisfy a packet length limitation described here or elsewhere. The field MSG_Payload 290 is 32 bits. It contains the message or message fragment. The message or final message fragment may be padded with 2 zero bytes to ensure 32-bit alignment.

Figure 10:
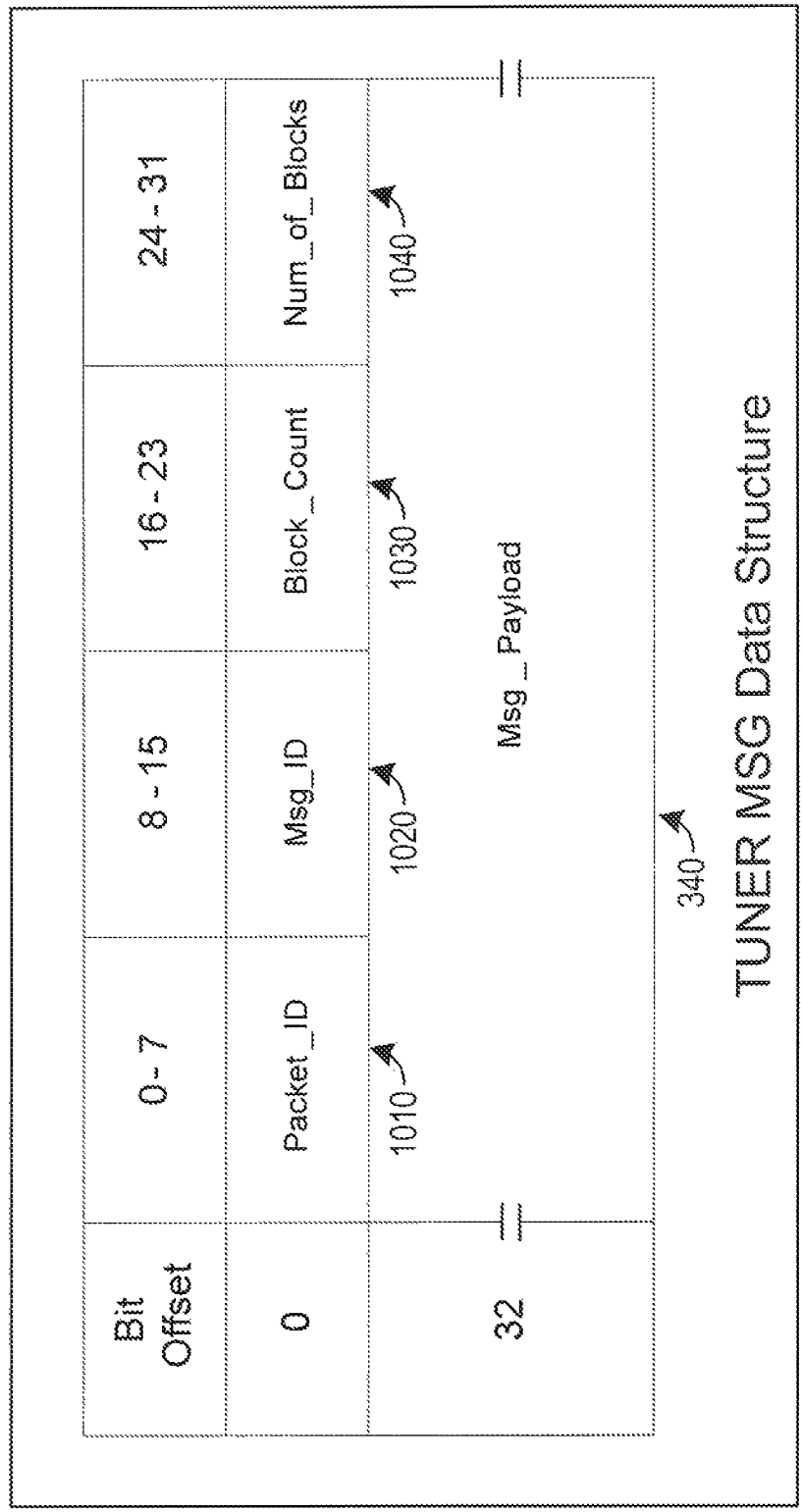
FIG. 10 shows a TUNER MSG data structure in accordance with one embodiment of the present invention.

FIG. 10 shows a tuner message data structure 457 in accordance with one embodiment of the present invention. The tuner message data structure 457 is associated with a method in accordance with one embodiment of the present invention of encapsulating the tuner message data into a data structure, so that a single data interface protocol can be used within the receiver, if desired. The bit-fields of the tuner message data structure 457 are defined next, and illustrated in FIG. 10.

The field Packet_ID 1010 is 8 bits. It is defined in FIG. 12, and indicates that the packet contains a message or Message fragment directed to or from the Tuner. The field Msg_ID 1020 is 8 bits. It indicates the type of message or message fragment contained in the packet. The values of Msg_ID may be defined to any type of message that a Tuner implementation requires, including as examples: TUNE_TO_FREQ and STOP_TUNER. The field Block_Count 1030 is 8 bits. It holds the number of the message fragment contained in the packet, or zero if the entire message is contained in the packet. The $i^{th}$ fragment of a message is assigned a Block_Count of i. A message may be divided into fragments to satisfy a packet length limitation described here or elsewhere. The field Num_of_Blocks 1040 is 8 bits. It holds the number of the message fragment contained in the packet, or zero if the entire message is contained in the packet. The $i^{th}$ fragment of a message is assigned a Block_Count of i. A message may be divided into fragments to satisfy a packet length limitation described here or elsewhere. The field MSG_Payload 340 is 32 bits. It contains the Message or message fragment. The message or final message fragment may be padded with 2 zero bytes to ensure 32-bit alignment.

FIG. 11 shows a UDP/IP interface, which is prior art. UDP encapsulation is formally defined in RFC 768, and IP encapsulation is formally defined in RFC 791. A typical UDP/IP encapsulation using IPv4 is described in FIG. 11, though an updated version of UDP or IP, such as IPv6 (defined in RFC 2460) may also be employed. Transmission Control Protocol ("TCP"), defined by RFC 793, or other transport layer protocols may be used in place of UDP.

The FIC, TPC, DEMOD MSG and TUNER MSG may share the same IP address and UDP port number. In this case, the receiver of these packets may rely on the Packet_ID field to demultiplex the packet types. Alternatively, two or more of these packets may be assigned distinct UDP port numbers. In this case, demultiplexing of packet types can be handled by the UDP layer parser. Finally, two or more of these packet types may be assigned distinct IP addresses, in which case demultiplexing of packet types can be handled by the IP layer parser.

Default values for IP source and destination addresses and UDP port numbers shall be assigned to each packet type at device start-up. These values may be updated by the controller via DEMOD_MSG commands as needed. Thus, the present invention is compatible with a Dynamic Host Configuration Protocol ("DHCP") server, as defined in RFC 2131 and RFC 3315, which assigns IP addresses during operation. Other methods of dynamic IP assignment may be possible in accordance with one embodiment of the present invention.

FIG. 12 shows a packet ID definition in accordance with one embodiment of the present invention. The Packet_ID field may be used by the receiver of UDP/IP packet to determine the type of payload. The Packet_ID field allows all the packet types listed in the figure to share a single IP address and UDP port number. In this case, the receiver of the packet may rely on the Packet_ID to demultiplex the packet to the correct packet parser. The Packet_ID may take on additional values if other packet types are required by the DTV receiver implementation.

As would be apparent to one skilled in the art, the various functions of signal processing may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An ATSC A/153 digital television receiver comprising:
   a tuner-and-analog front end that tunes to a proper broadcast channel, performs level setting and filtering, digitizes a received analog signal, and outputs a bit stream;
   a baseband demodulator that receives the bit stream output from the tuner-and-analog front end and performs direct digital down conversion, filtering, symbol timing and carrier frequency synchronization, equalization, and forward error correction, and outputs multiple IP encapsulated and non-IP-encapsulated data streams;

a network interface processor that receives the multiple IP encapsulated and non-IP-encapsulated data streams from the baseband demodulator and combines and outputs the data streams into an IP encapsulated data stream that the network interface processor outputs; and a controller that receives the IP encapsulated data stream from the network interface processor and renders data extracted from the IP encapsulated data stream for display and audio presentation.

2. The ATSC A/153 digital television receiver of claim 1 wherein the network interface processor outputs tuner message data to the tuner-and-analog front end.

3. An ATSC A/153 digital television receiver comprising:

a tuner-and-analog front end that tunes to a proper broadcast channel, performs level setting and filtering, digitizes a received analog signal, and outputs a bit stream;

a baseband demodulator that receives the bit stream output from the tuner-and-analog front end and performs direct digital down conversion, filtering, symbol timing and carrier frequency synchronization, equalization, and forward error correction, and outputs multiple IP encapsulated and non-IP-encapsulated data streams;

a network interface processor that receives a majority of the multiple IP encapsulated and non-IP-encapsulated data streams from the baseband demodulator and combines and outputs the data streams into an IP encapsulated data stream that the network interface processor outputs; and a controller that receives the IP encapsulated data stream from the network interface processor and a minority of the multiple IP encapsulated and non-IP-encapsulated data streams from the baseband demodulator and renders data extracted from the IP encapsulated data stream from the network interface processor and the minority of the multiple IP encapsulated and non-IP-encapsulated data streams from the baseband demodulator for display and audio presentation.

* * * * *